United States Patent
Sagi

(10) Patent No.: US 7,337,247 B2
(45) Date of Patent: Feb. 26, 2008

(54) BUFFER AND METHOD OF DIAGNOSING BUFFER FAILURE

(75) Inventor: Shigekatsu Sagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 529 days.

(21) Appl. No.: 10/971,061

(22) Filed: Oct. 25, 2004

(65) Prior Publication Data

US 2006/0005062 A1     Jan. 5, 2006

(30) Foreign Application Priority Data

Jun. 30, 2004   (JP)   ............................ 2004-194514

(51) Int. Cl.
*G06F 3/00* (2006.01)
*G06F 5/00* (2006.01)
*G06F 13/00* (2006.01)

(52) U.S. Cl. .................. 710/52; 710/55; 714/718; 714/799; 714/800; 714/5; 714/6

(58) Field of Classification Search ...................... None
See application file for complete search history.

(56) References Cited

U.S. PATENT DOCUMENTS

2005/0172188 A1 *   8/2005   Burdine ....................... 714/726

FOREIGN PATENT DOCUMENTS

JP     4-190429 A     7/1992
JP     8-314816 A     11/1996

* cited by examiner

*Primary Examiner*—Kim Huynh
*Assistant Examiner*—Scott Sun
(74) *Attorney, Agent, or Firm*—Staas & Halsey LLP

(57) ABSTRACT

A buffer includes an input unit that inputs data; an output unit that outputs the data; a plurality of registers that stores the data while sequentially shifting the data from the input unit to the output unit; an output-data selecting unit that selects desired data from among the data stored based on a predetermined priority, extract the desired data from a corresponding register, and outputs the desired data to the output unit; a detecting unit that detects an error in the desired data; a diagnostic-data writing unit that writes diagnostic data for diagnosing failure of the register in the register from which the desired data is extracted; and a diagnostic-data error detecting unit that detects an error in the diagnostic data.

9 Claims, 10 Drawing Sheets

INPUT OF DATA A0

INPUT OF DATA B0

OUTPUT OF DATA

B0
ERROR DETECTION ON B0

INPUT OF DATA B1 AND A1

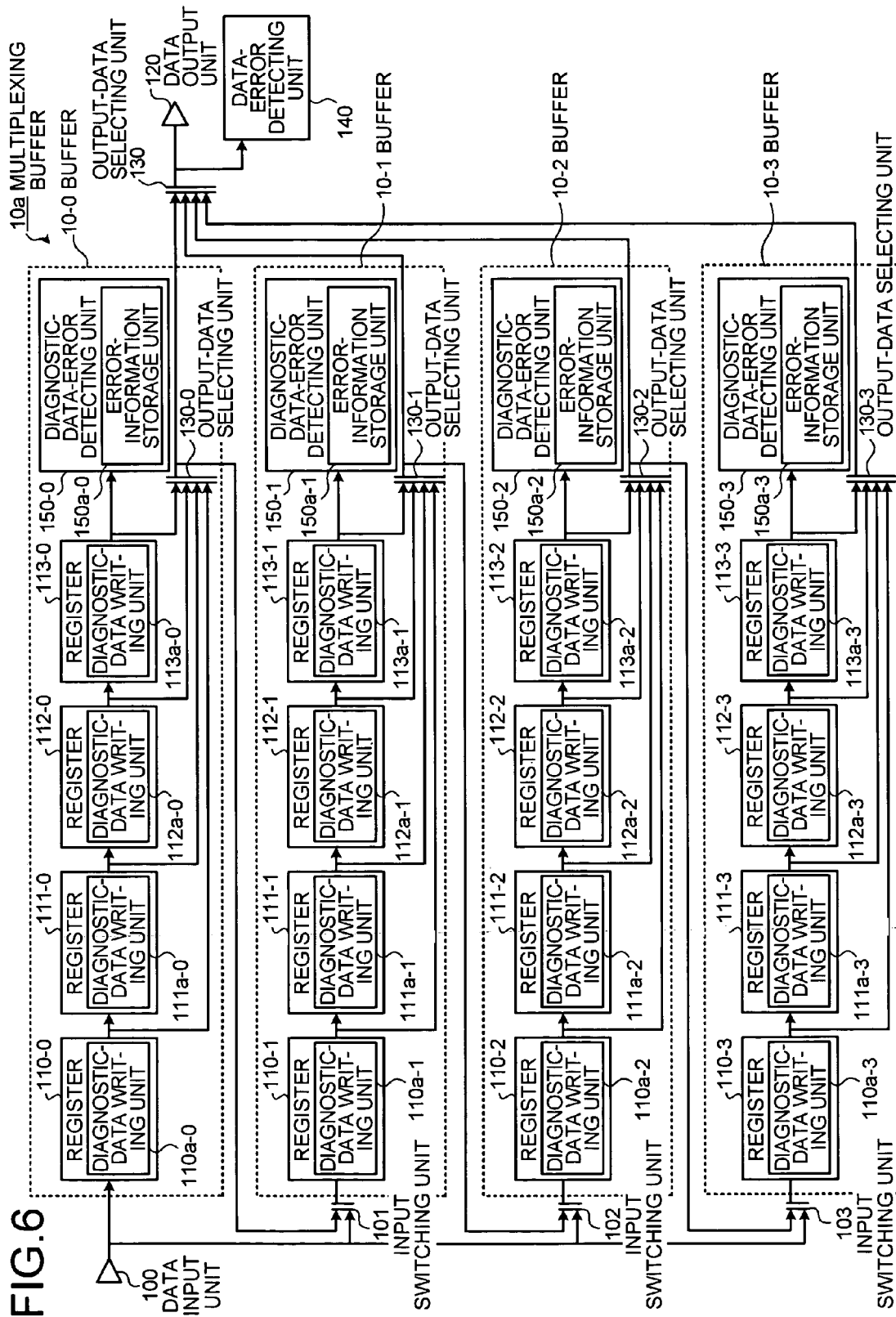

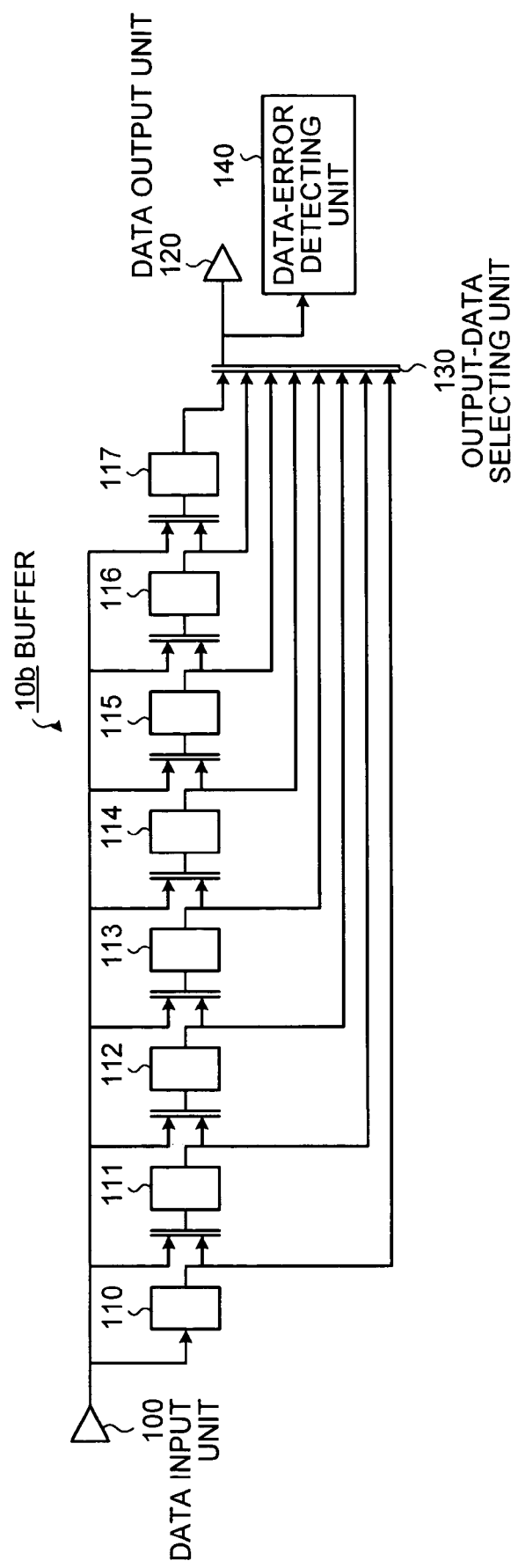

INPUT OF DATA A0

INPUT OF DATA B0

OUTPUT OF DATA

B0
ERROR DETECTION ON B0

INPUT OF DATA B1 AND A1

PRIOR ART

PRIOR ART

… (1) BUFFER AND METHOD OF DIAGNOSING BUFFER FAILURE

BACKGROUND OF THE INVENTION

1) Field of the Invention

The present invention relates to a buffer and a method of diagnosing buffer failure, and more particularly, to a buffer and a method of diagnosing buffer failure where a failure can be diagnosed during an ordinary operation without depending on a load situation.

2) Description of the Related Art

Conventionally, a plurality of registers in a buffer stores data input while sequentially shifting the data. The buffer selects data from among the data stored in the registers based on a predetermined priority, and outputs the data while detecting an error in the data. FIG. 7 is a block diagram of a configuration of a conventional buffer 10b. FIGS. 8A to 8G are diagrams of an operation example of the buffer 10b shown in FIG. 7.

As shown in FIG. 7, in the buffer 10b, a data input unit 100 inputs data, registers 110 to 117 stores the data input while sequentially shifting from the register 117 that is arranged closest to a data output unit 120 to the register 110 to 116, and an output-data selecting unit 130 that selects data with higher priority from among the data stored in the registers 110 to 117 to extract the data selected. For example, as shown in FIG. 8F, when the data output unit 120 outputs data A0 stored in the register 117, data A1 is shifted from the register 116 to the register 117, which has output the data A0. At a same time, a data-error detecting unit 140 detects an error in the data A0. It can be assumed that there is no failure in registers through which the data A0 has been shifted if an error is not detected in the data A0.

Once a register outputs a data, a data that is stored in a following register is shifted to the register. Therefore, unless the buffer 10b becomes full with data, a register that is situated close to the data input unit 100 is not used. A test that is performed before shipping to diagnose if there is failure in registers has been carried out creating high load conditions in the buffer 10b. However, the buffer 10b depends on not only a load but also various factors such as a system configuration or an operation timing of other devices. For example, in usual operations of a recent large scale server, since a system configuration or operation timing dynamically changes, there is a possibility that failure in a register that has been missed to be detected in the test becomes revealed as being used. Thus, in the conventional buffer, it is impossible to diagnose the buffer during normal operation, without depending on the load conditions.

For example, Japanese Patent Application Laid-Open No. H8-314816 discloses a conventional technology in which after a buffer is once disabled and registers are made full with data, the buffer is enabled to diagnose if there is failure in the buffer.

In the above conventional technology, it is possible to diagnose if there is failure in the buffer, once disabling the buffer and making the registers full with data, and then enabling the buffer. However, it is impossible to diagnose if there is failure in the buffer during normal operation, without depending on load conditions.

SUMMARY OF THE INVENTION

It is an object of the present invention to solve at least the above problems in the conventional technology.

A buffer according to one aspect of the present invention includes an input unit that inputs data; an output unit that outputs the data input by the input unit; a plurality of registers that stores the data input by the input unit while sequentially shifting the data from the input unit to the output unit; an output-data selecting unit that selects desired data from among the data stored in the registers based on a predetermined priority, extract the desired data from a corresponding register, and outputs the desired data to the output unit; a detecting unit that detects an error in the desired data; a diagnostic-data writing unit that writes diagnostic data, which is for diagnosing a failure of the register, in the register from which the desired data is extracted; and a diagnostic-data error detecting unit that detects an error in the diagnostic data.

A method of diagnosing a buffer failure according to another aspect of the present invention includes inputting data; outputting the data; storing the data in a plurality of registers while sequentially shifting the data from the inputting to the outputting; selecting desired data from among the data stored in the registers based on a predetermined priority; extracting the desired data from a corresponding register; outputting the desired data to the outputting; detecting an error in the desired data; writing diagnostic data, which is for diagnosing a failure of the register, in the register from which the desired data is extracted; and detecting an error in the diagnostic data.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 6 is a block diagram of a configuration of a buffer according to a second embodiment;

FIG. 7 is a block diagram of a configuration of a conventional buffer; and

DETAILED DESCRIPTION

Exemplary embodiments of a buffer and a method of diagnosing a buffer failure according to the present invention will be explained below in detail with reference to the accompanying drawings.

Figure 1:
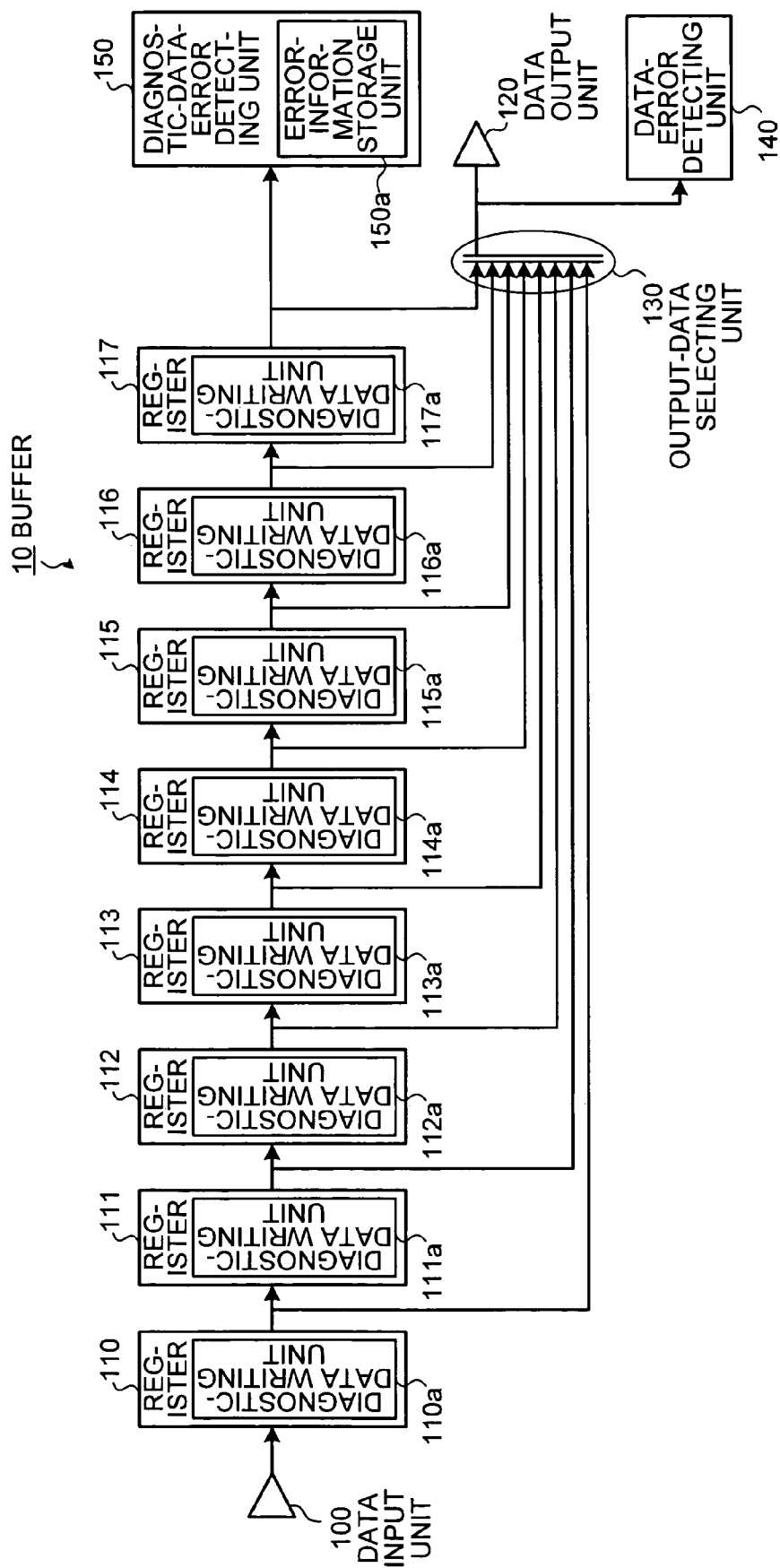
FIG. 1 is a block diagram of a configuration of a buffer according to a first embodiment.

FIG. 1 is a block diagram of a configuration of the buffer 10. The buffer 10 includes a data input unit 100 that inputs data, a data output unit 120 that outputs the data, registers 110 to 117 that store the data while sequentially shifting, through the registers 110 to 117, the data from the data input unit 100 to the data output unit 120, an output-data selecting unit 130 that selects data from among the data stored in the registers 110 to 117 based on a predetermined priority, and extracts to output the data to the data output unit 120, and a data-error detecting unit 140 that detects an error in the data extracted. In the buffer 10, it is possible to diagnose if there is failure in the registers 110 to 117 during normal operation, without depending on load conditions.

Diagnostic-data writing units 110a to 117a write diagnostic data to diagnose if there is failure in a register from which the data is extracted by the output-data selecting unit 130. A diagnostic-data-error detecting unit 150 detects an error in each of the diagnostic data output from the data output unit 120. Therefore, in the buffer 10, it is possible to diagnose failure in each of the registers 110 to 117 during a normal operation, without depending on a load situation.

The buffer 10 shown in FIG. 1 constitutes an input/output buffer for a main storage controller that inputs data from a cache in a central processing unit (CPU) of a computer to a main storage device or outputs data from the main storage device to the cache. The buffer 10 includes the data input unit 100, the registers 110 to 117, the data output unit 120, the output-data selecting unit 130, the data-error detecting unit 140, and the diagnostic-data-error detecting unit 150.

The data input unit 100 inputs data from the cache in the CPU. The registers 110 to 117 store data input from the data input unit 100 while sequentially shifting, through the registers 110 to 117, the data from the data input unit 100 to the data output unit 120. The registers 110 to 117 include the diagnostic-data writing units 110a to 117a respectively. The diagnostic-data writing unit 110a writes, in the register 110 from which data is extracted by the output-data selecting unit 130, diagnostic-data to diagnose if there is failure in the register 110.

The diagnostic-data writing unit 110a writes, in diagnostic data, invalid-data identification information for identifying invalid data. For example, the invalid-data identification information is written in an operation portion in the diagnostic data. The diagnostic-data writing unit 110a can write a predetermined bit pattern in the diagnostic data. For example, two bit patterns "01010101 . . . " and "10101010 . . . " that are inverted to each other and that function as a parity bit are alternately used. Since the diagnostic-data writing unit 110a writes a bit pattern in a diagnostic data, the buffer 10 can detect failure in which a specific bit in a register stacks to "0" or "1", and such failure that a bit is influenced by a bit(s) adjacent thereto.

The diagnostic-data writing unit 110a can write address information of the register in which the diagnostic data is written. The diagnostic-data writing unit 110a can write more than one pieces of the address information in the diagnostic data. Thus, in the buffer 10, an error in a diagnostic data output from the data output unit 120 can be detected by the diagnostic-data-error detecting unit 150, and a failed register can be specified based on valid address information from which no error is detected among the pieces of the address information written in the diagnostic data. For example, when identification (ID) information fro the register 115 is obtained from the valid address information, it is found that one of the registers 115 to 117 has failure. In the present embodiment, the diagnostic-data writing unit 110a writes more than one pieces of the address information in the diagnostic data as diagnostic data.

Since the diagnostic-data writing unit 110a writes more than one pieces of address information at a time of writing diagnostic data into a register, the buffer 10 can specify a failed portion in a register based on valid address information.

The data output unit 120 outputs data input by the data input unit 100 to a main storage unit of the computer. The output-data selecting unit 130 selects data based on a predetermined priority from among the data stored in the registers 110 to 117 and extracts to output the data selected to the data output unit 120. The data-error detecting unit 140 detects an error in the data extracted. The data-error detecting unit 140 also detects an error in diagnostic data based on an error detecting code. For example, the data-error detecting unit 140 detects an error in diagnostic data using a parity bit. The diagnostic-data-error detecting unit 150 detects an error in diagnostic data that is output from the data output unit 120, and includes an error-information storage unit 150a. The error-information storage unit 150a stores diagnostic data from which an error is detected. Since the diagnostic data includes more than one pieces of address information, the diagnostic-data-error detecting unit 150 can specify a register that has failure based on valid address information from which no error has been detected. The diagnostic-data-error detecting unit 150 detects an error in the diagnostic data based on the error detecting code. For example, the diagnostic data-error detecting unit 150 detects an error in a diagnostic data using a parity bit.

Figure 2:
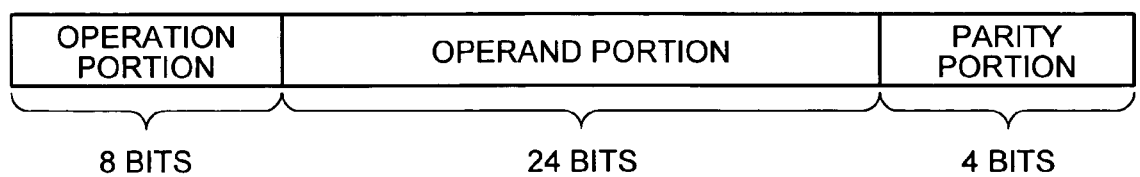
FIG. 2 is a schematic of an example of a structure of data that is stored in the buffer shown in FIG. 1.

FIG. 2 is a schematic of one example of the structure of data stored in the buffer device 10. For example, the data uses 36 bits in word, and includes an operation portion, an operand portion, and a parity portion. The operation portion uses 8 bits, and indicates instructions for reading/writing of the data. The operand portion uses 24 bits and indicates an address and/or contents of the data. The parity portion uses 4 bits and includes a parity bit to detect an error in the operation portion and the operand portion for each 8 bits.

The diagnostic data is data for diagnosing failure in a register and includes invalid-data identification information to identify invalid data. The diagnostic data has a predetermined bit pattern. For example, two bit patterns "01010101 . . . " and "10101010 . . . ", which are inverted to each other and are a parity bit, are alternately used. The diagnostic data may include address information of a register, and may include more than one pieces of the address information. In the present embodiment, the diagnostic data includes more than one pieces of the address information.

Figure 3A:
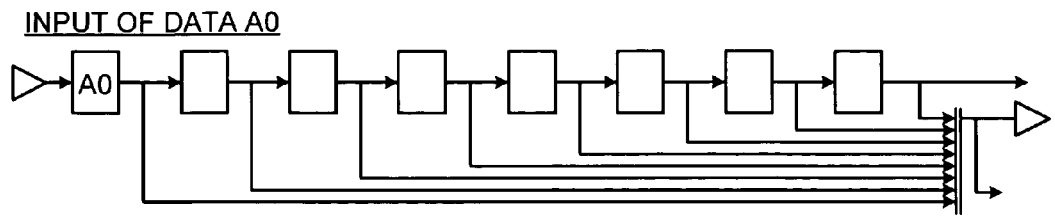
FIGS. 3A to 3G are schematics of an operation example of the buffer shown in FIG. 1.
Figure 3B:
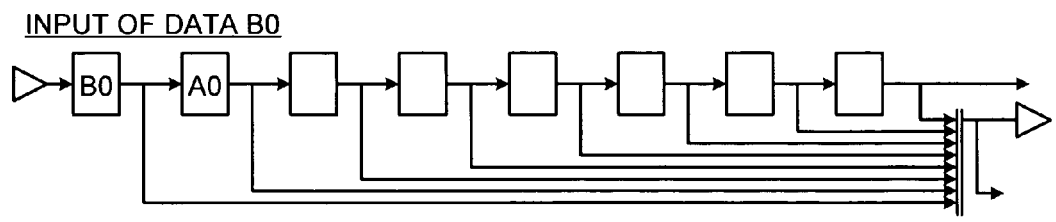
Figure 3C:
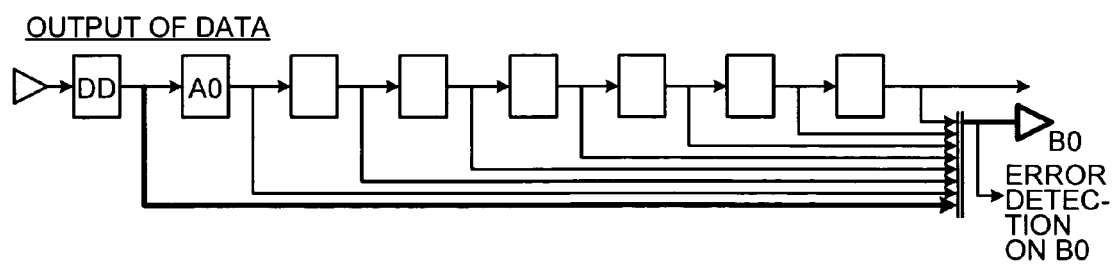
Figure 3D:
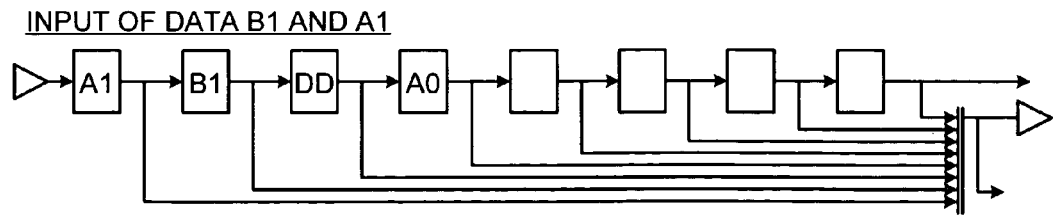
Figure 3E:
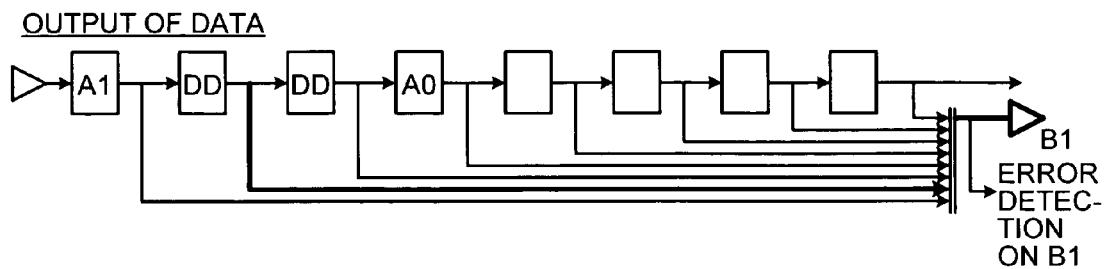
Figure 3F:
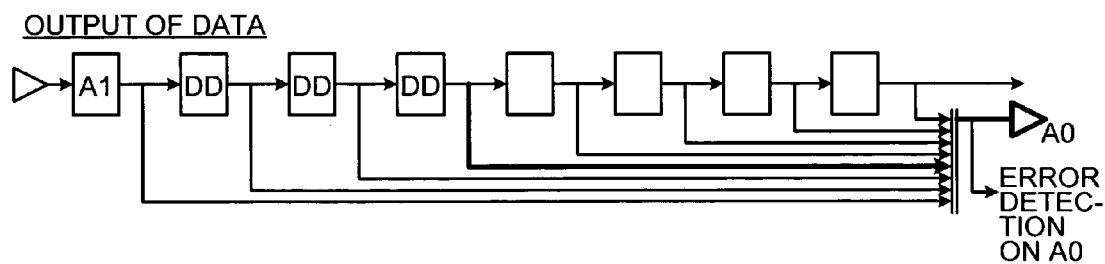
Figure 3G:
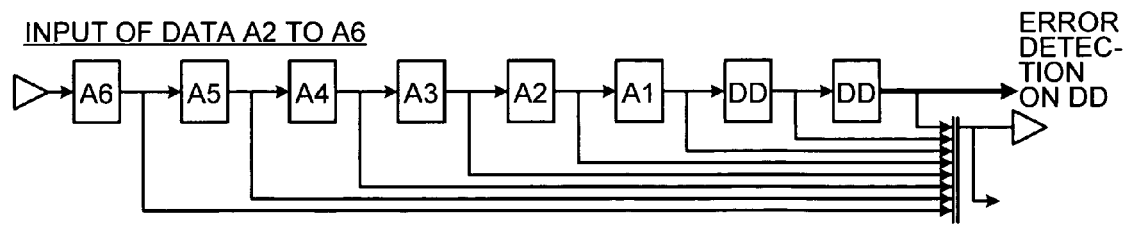

FIG. 3G is a schematic of an operation example of the buffer 10 shown in FIG. 1. As shown in FIGS. 3A and 3B, the data input unit 100 sequentially inputs data A0 and B0. Then, the output-data selecting unit 130 extracts the data B0 to output to the data output unit 120 based on a predetermined priority as shown in FIG. 3C. At a same time, the data-error detecting unit 140 performs error detection in the data B0, and the diagnostic-data writing unit 110a writes diagnostic data (DD) in a register from which the data piece B0 is extracted.

As shown in FIG. 3D, the data input unit 100 sequentially inputs data B1 and A1. As shown in FIGS. 3E and 3F, the output-data selecting unit 130 sequentially extracts the data B1 and A0 to output to the data output unit 120 based on the predetermined priority. At a same time, the data-error detecting unit 140 sequentially performs the error detection on each of the data B1 and A0, and the diagnostic-data writing unit 110a sequentially writes the diagnostic data (DD) in registers from which the data B1 and A0 are extracted.

As shown in FIG. 3G, the data input unit 100 sequentially inputs data A2 to A6. Thus, the buffer 10 controls data and the registers such that the data are input from the data input unit 110 and are shifted through the registers to the data output unit 120, and that the diagnostic data remains in each of the registers from which the data is extracted. Therefore, it is possible to make data, which is input, pass through all registers in the buffer 10. In other words, there is no register that remains unused. Accordingly, it is possible to diagnose if there is failure in a register during normal operation of the buffer 10, without depending on load conditions.

Figure 4:
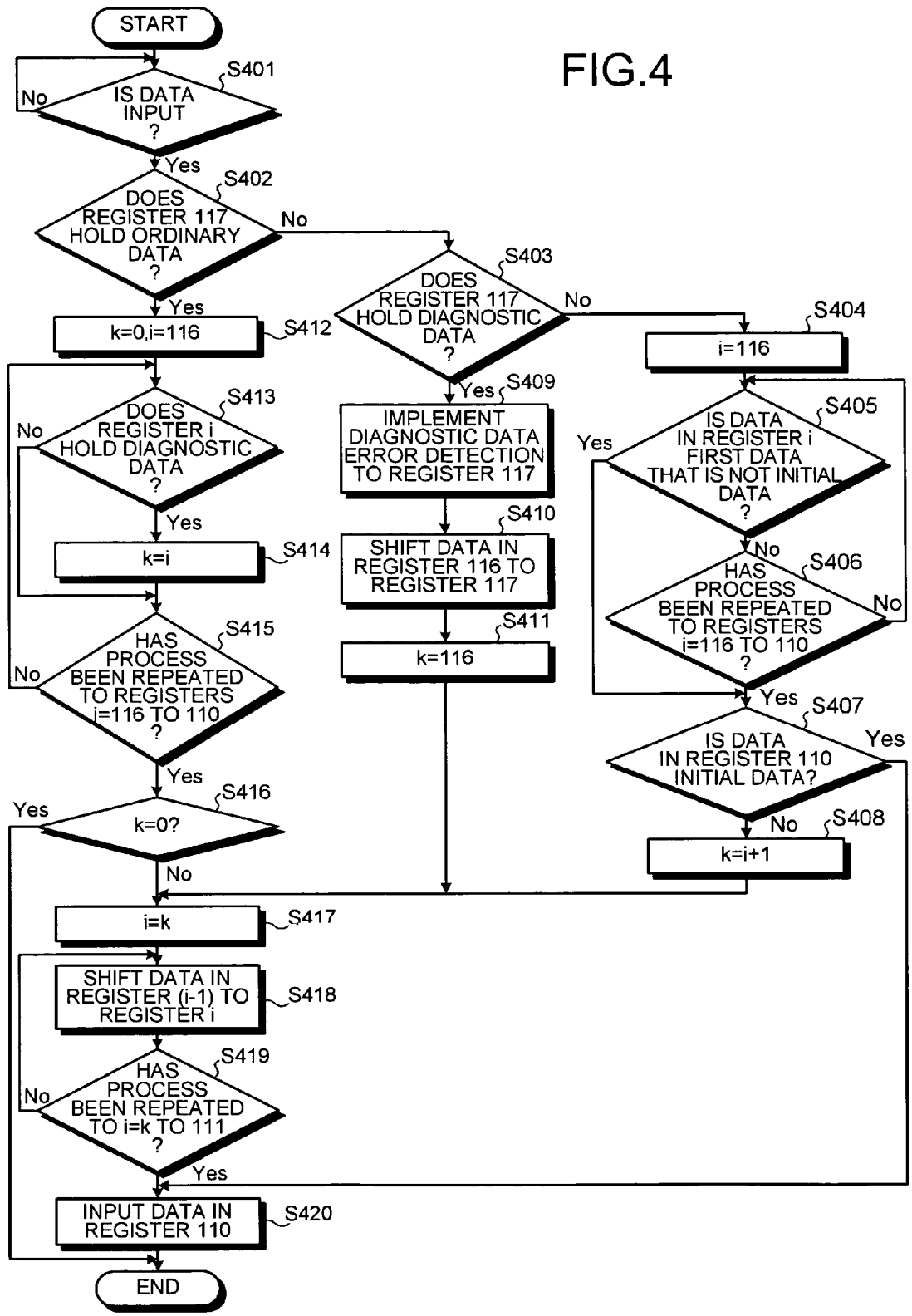
FIG. 4 is a flowchart of an input procedure in the buffer shown in FIG. 1.

FIG. 4 is a flowchart of an input procedure of the buffer 10 shown in FIG. 1. An input procedure of the buffer 10 is roughly classified into two parts: procedure for a case in which the register 117 holds initial data (steps S401 to S408), a procedure for a case in which the register 117 holds diagnostic data (steps S409 to S411), and a procedure for a case in which the register 117 holds ordinary data (steps S412 to S420).

A state in which the register 117 holds the ordinary data or the diagnostic data indicates that the registers 110 to 117 is full with ordinary data or diagnostic data. A state in which the register 117 holds the initial data indicates that the registers 110 to 117 are not yet filled with data or the diagnostic data because the initial data at a time of starting the buffer 10 still remains in the buffer 10. Therefore, a procedure at steps S401 to S408 is carried out only in a transient state just after starting the buffer 10, and this procedure for the transient state is not carried out after the buffer 10 reaches a state of steady operation.

As shown in FIG. 4, the data input unit 100 waits data input from the cache in the CPU (step S401). When the data input unit 100 inputs data from the cache ("YES" at step S401), the output-data selecting unit 130 determines whether the register 117 holds data (step S402). When it is determined that the register 117 does not hold data ("NO" at step S402), the output-data selecting unit 130 further determines whether the register 117 holds diagnostic data (step S403).

When it is determined that the register 117 does not hold diagnostic data ("NO" at step S403), the output-data selecting unit 130 determines that the data in the register 117 is initial data and sets a subscript of a register as i=116 (step S404). The output-data selecting unit 130 determines whether data in the register i is first data that is not initial data (step S405). When it is determined that the data in the register i is the first data that is not the initial date ("YES" at step S405), the output-data selecting unit 130 proceeds to step S407. On the other hand, when the data in the register i is initial data ("NO" at step S405), the output-data selecting unit 130 determines whether these steps have been repeated to the registers i=116 to 110 (step S406). When it is determined that the steps have not been repeated to the registers i=116 to 110, the output-data selecting unit 130 returns back to step S405 to repeat steps S405 to S406.

On the other hand, when it is determined that the above steps have been repeated to the registers i=116 to 110 ("YES" at step S406), the output-data selecting unit 130 further determines whether data in the register 110 is initial data (step S407). When the data in the register 110 is not initial data ("NO" at step S407), the output-data selecting unit 130 determines that the register i holds ordinary data, and sets a subscript of a register as k=i+1 (step S408). The output-data selecting unit 130 then performs a procedure from steps S417 to S420. The output-data selecting unit 130 shifts the data toward the register 117 through the registers one by one to input new data in the register 110. On the other hand, when the data in the register 110 is initial data ("YES" at step at S407), the output-data selecting unit 130 proceeds to step S420 to input new data in the register 110. Thus, the buffer 10 performs the procedure at steps S401 to S408 when the register 117 holds initial data.

When the register 117 holds diagnostic data, steps S409 to S411 are carried out. When the register 117 holds diagnostic data ("YES" at step S403), the diagnostic-data-error detecting unit 150 detects an error in the diagnostic data (step S409). The diagnostic-data-error detecting unit 150 shifts data in the register 116 to the register 117 (step S410). The output-data selecting unit 130 sets a subscript of a register as k=116 (step S411), and then performs a procedure at steps S417 to S420. The output-data selecting unit 130 shifts data toward the register 117 through the registers one by one to input new data in the register 110. Thus, the buffer 10 performs the procedure at steps S409 to S411 when the data piece in the register 117 is diagnostic data.

When the register 117 holds ordinary data, steps S412 to step S420 are carried out. When the register 117 holds ordinary data ("YES" at step S402), the output-data selecting unit 130 sets subscripts of a register to k=0 and i=116 (step S412).

The output-data selecting unit 130 determines whether the register i holds diagnostic data (step S413). When it is determined that the register i holds diagnostic data ("YES" at step S413), the output-data selecting unit 130 sets a subscript of the register that holds the diagnostic data to k=i (step S414). When it is determined that the register i does not hold diagnostic data ("NO" at step S413), the output-data selecting unit 130 further determines whether the above steps have been repeated to i=116 to 111 (step S415). When it is determined that the steps have not been repeated to the registers i=116 to 110 ("NO" at step S415), the output-data selecting unit 130 returns back to step S413 and repeat the procedure at steps S413 to S415 to find a register that holds diagnostic data.

On the other hand, when it is determined that the above steps have been repeated to the registers i=116 to 110 ("YES" at step S415), the output-data selecting unit 130 further determines whether the subscript is k=0 (step S416). When the subscript is k=0 ("YES" at step S416), that is, when diagnostic data is not found, the output-data selecting unit 130 terminates this procedure because there is no space in which data can be input.

On the other hand, when the subscript is not k=0 ("NO" at step S416), that is, when diagnostic data is found, the output-data selecting unit 130 sets the subscript of the register to i=k (step S417). The output-data selecting unit 130 shifts data in the register (i−1) to the register i (step S418) and determines whether data shifting has been repeated to the registers i=k to 111 (step S419).

When the data shifting has not been repeated to the registers i=k to 111 ("NO" at step S419), the output-data selecting unit 130 returns back to step S418 to repeat the procedure from steps S418 to S419. When the data shifting has been repeated to the registers i=k to 111 ("YES" at step S419), the data input unit 100 inputs new data in the register 110.

In the procedure that is carried out when the register 117 holds initial data, data in the registers 116 to 111 are shifted toward the register 117 one by one, and the data input unit 100 inputs new data in the register 110. In the procedure that is carried out when the register holds diagnostic data, the diagnostic-data-error detecting unit 150 detects an error in diagnostic data in the register 117 to shift data in a following stage to the diagnostic data, and the data input unit 100 inputs new data in the register 110. In the procedure that is carried out when the register 117 holds ordinary data, by shifting data in a following stage to diagnostic data held in the register, the data input unit 100 inputs new data. Thus, in the buffer 10, it is possible to let data input to pass through all the registers without holding diagnostic data more than necessary. As a result, there is no register that remains unused. Therefore, failure in the buffer 10 can be diagnosed during normal operation of the buffer 10, without depending on load conditions.

Figure 5:
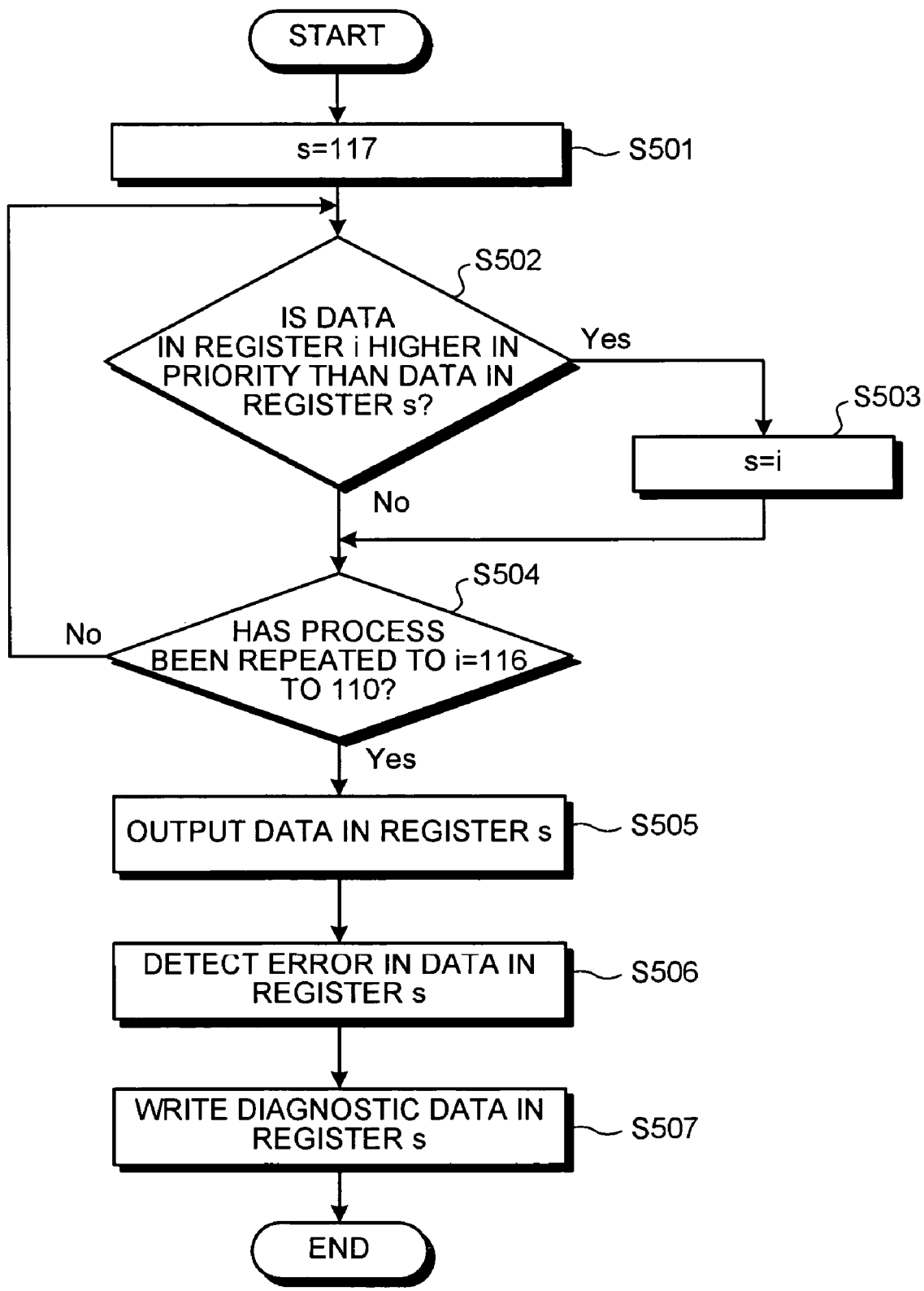
FIG. 5 is a flowchart of an output procedure in the buffer shown in FIG. 1.
Figure 8A:
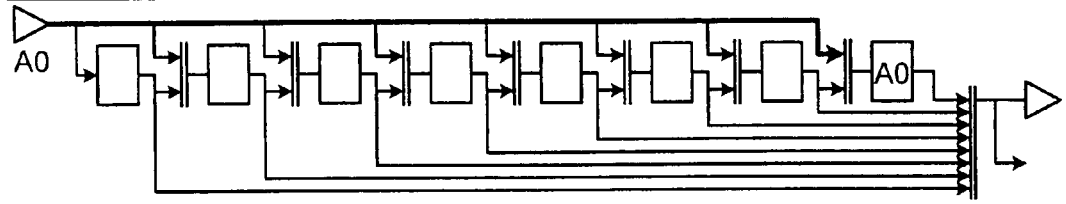
FIGS. 8A to 8G are schematics of an operation example of the buffer shown in FIG. 7.
Figure 8B:
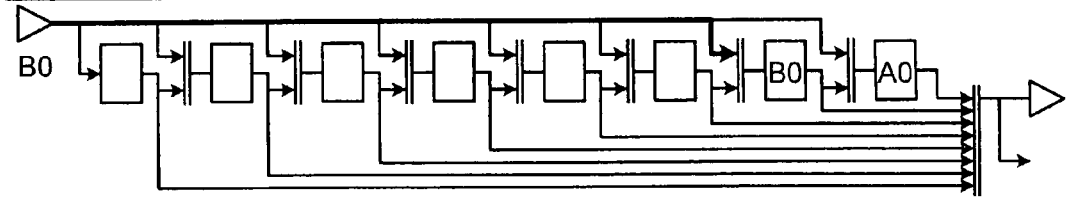
Figure 8C:
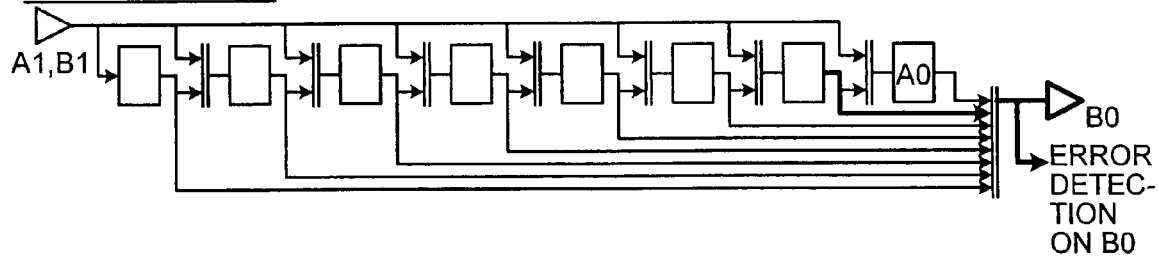
Figure 8D:
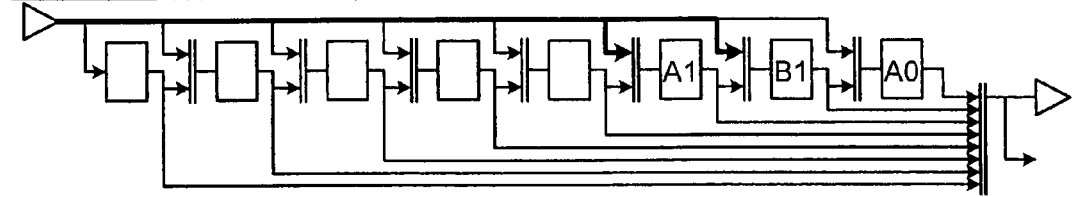
Figure 8E:
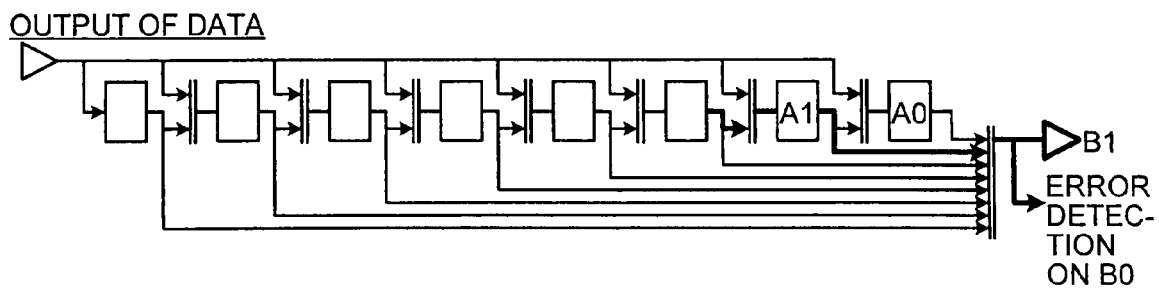
Figure 8F:
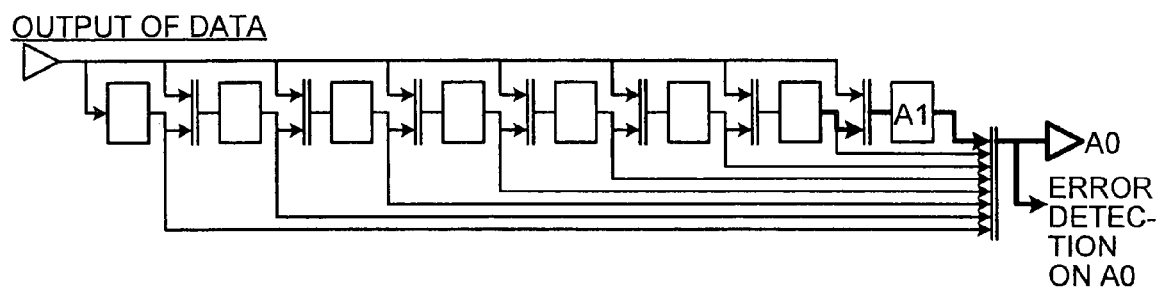
Figure 8G:
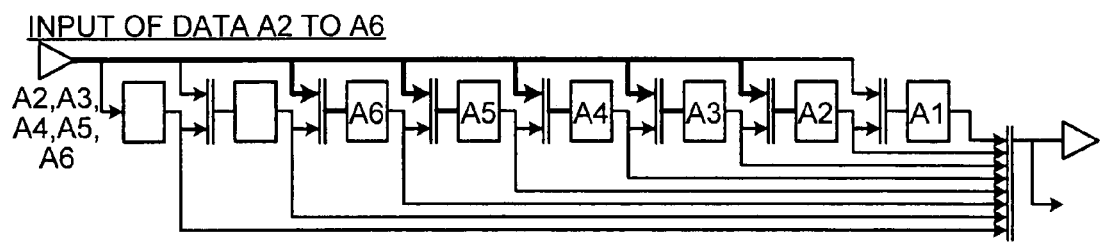

FIG. 5 is a flowchart of an output procedure in the buffer 10 shown in FIG. 1. First, the output-data selecting unit 130 sets a subscript s of a register to s=117 (step S501). The output-data selecting unit 130 determines whether data in the register i has higher priority than data in the register s (step S502).

When the data in the register i has higher priority than the register s ("YES" at step S502), the output-data selecting unit 130 set a subscript as s=i (step S503). On the other hand, when the data piece in the register i has lower priority than the register s ("NO" at step S502), the output-data selecting unit 130 determines whether comparison on priority has been repeated to the registers i=116 to 110 (step S504).

When the comparison has not been repeated to the registers i=116 to 110 (step S504, No), the output-data selecting unit 130 returns back to step S502 to repeat steps S502 to S503. On the other hand, when the comparison has been repeated to the registers i=116 to 110 ("YES" at step S504), the data output unit 120 outputs data in the registers (step S505). The data-error detecting unit 140 detects an error in the data in the register s (step S506), and the diagnostic-data writing unit in the data register s writes diagnostic data in the register s (step S507).

The output-data selecting unit 130 selects data in the register s that has the highest priority among data in the registers 110 to 117 based on a predetermined priority. Then, the output-data selecting uni130 extracts the data with the highest priority from the register s to output to the data output unit 120. The diagnostic-data writing unit in the register s writes diagnostic data in the register s from which the data is extracted. Thus, in the buffer 10, it is possible to let data input to pass through all the registers 110 to 117. As a result, there is no register that remains unused. Therefore, failure in the registers 110 to 117 can be diagnosed during normal operation of the buffer 10, without depending on load conditions.

As described above, according to the first embodiment, the diagnostic-data writing units 110a to 117a writes, in a register from which data is extracted, diagnostic data for diagnosing failure in the register. The diagnostic data-error detecting unit 150 detects an error in the diagnostic data. Therefore, it is possible to diagnose failure in the buffer 10 during ordinary operation, without depending on load conditions.

Moreover, the diagnostic-data writing units 110a to 117a write, in the diagnostic data, address information of the registers in which the diagnostic data is written. Therefore, in the buffer 10, it is possible to specify a failed register based on diagnostic data from which an error is detected.

Furthermore, the diagnostic-data-error detecting unit 150 detects an error in the diagnostic data based on an error detecting code. An error in the diagnostic data can be easily detected in the buffer 10.

Moreover, the diagnostic-data-error detecting unit 150 stores diagnostic data from which an error is detected. Therefore, a failed register can be easily specified in the buffer 10.

FIG. 6 is a block diagram of a configuration of a multiplexing buffer 10a according to a second embodiment of the present invention. Explanation for same contents as in the first embodiment will be omitted, and only different contents will be explained.

As shown in FIG. 6, the multiplexing buffer 10a according to the second embodiment includes the data input unit 100, input switching units 101 to 103, buffers 10-0 to 10-3, the data output unit 120, output data selecting units 130 and 130-0 to 130-3, and the data-error detecting unit 140.

The buffers 10-0 to 10-3 includes four sets of registers (110-0 to 110-3, 111-0 to 111-3, 112-0 to 112-3, and 113-0 to 113-3), output data selecting units 130-0 to 130-3, and diagnostic-data-error detecting units 150-0 to 150-3. Outputs of the output data selecting units 130-0 in the buffers 10-0 to 10-3 are connected to the data input unit 100 in the buffers 10-1 to 10-3 of a following stage.

Since the buffers 10-0 to 10-3 include diagnostic-data-error detecting units 150-0 to 150-3, failure in diagnostic data can be detected. The input switching units 101 to 103 perform switching between the data input unit 100 and the output data selecting units 130-0 to 130-2 of a preceding stage.

The diagnostic-data writing units (110a-0 to 110a-3) to (113a-0 to 113a-3) write diagnostic data for diagnosing failure in a register in a register from which data is extracted by the output data selecting units 130-0 to 130-3. The diagnostic-data-error detecting units 150-0 to 150-3 detect an error in diagnostic data output from the buffers 10-0 to 10-3. Therefore, it is possible to diagnose failure in the multiplexing buffer 10a during normal operation, without depending on load conditions.

Moreover, the buffers 10-1 to 10-3 perform switching between the data input unit 100 and the output data selecting units 130-0 to 130-2 of the preceding stage. Therefore, although data is usually input from the buffers 10-0 to 10-2 of the preceding stages, data can be directly inputted from the data input unit 100 if any one of the buffers 10-0 to 10-2 of the preceding stage fails. Accordingly, even when failure occurs in one of the four-staged buffers 10-0 to 10-3, the buffer 10 can function normally by disconnecting a failed buffer.

Although the first to second embodiments of the present invention have been explained above, the present invention can be implemented through not only the above embodiments but also various embodiments modified within the scope and spirit of the technical idea described in claims.

For example, while in the first and second embodiments, a case in which the diagnostic data includes more than one pieces of address information has been explained, the present invention is not limited to only this case. The diagnostic data can include invalid-data identification information or a predetermined bit pattern.

According to the present invention, it is possible to diagnose failure in a buffer during a normal operation, without depending on load conditions.

Furthermore, according to the present invention, it is possible to specify a register that has failure in the buffer based on the diagnostic data from which an error has been detected.

Moreover, according to the present invention, an error in the diagnostic data can easily be detected.

Furthermore, according to the present invention, it is possible to easily specify a register that has failure in the buffer.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A buffer comprising:
   an input unit that inputs data;
   an output unit that outputs the data input by the input unit;
   a plurality of registers that stores the data input by the input unit while sequentially shifting the data from the input unit to the output unit;
   an output-data selecting unit that selects desired data from among the data stored in the registers based on a predetermined priority, extract the desired data from a corresponding register, and outputs the desired data to the output unit;
   a detecting unit that detects an error in the desired data;
   a diagnostic-data writing unit that writes diagnostic data, which is for diagnosing a failure of the register, in the register from which the desired data is extracted; and
   a diagnostic-data error detecting unit that detects an error in the diagnostic data, wherein the diagnostic data is sequentially shifted from the register, from which the desired data is extracted, to the output unit so as to enable to diagnose failure in a register during normal operation of the buffer without depending on load conditions.

2. The buffer according to claim 1, wherein the diagnostic-data writing unit writes identification information, which is for identifying invalid data, in the diagnostic data.

3. The buffer according to claim 1, wherein the diagnostic-data writing unit writes a predetermined bit pattern in the diagnostic data.

4. The buffer according to claim 1, wherein the diagnostic-data writing unit writes address information of the register in which the diagnostic data is written in the diagnostic data.

5. The buffer according to claim 1, wherein the diagnostic-data writing unit writes a plurality of pieces of address information of the register in which the diagnostic data is written in the diagnostic data.

6. The buffer according to claim 1, wherein the diagnostic-data error detecting unit detects an error in the diagnostic data using an error detecting code.

7. The buffer according to claim 1, wherein the diagnostic-data error detecting unit detects an error in the diagnostic data using a parity bit.

8. The buffer according to claim 1, further comprising a storage unit that stores diagnostic data from which the error is detected, wherein
   the diagnostic-data error detecting unit controls the storage unit to store the diagnostic data from which the error is detected.

9. A method of diagnosing a buffer failure comprising:
   inputting data;
   outputting the data;
   storing the data in a plurality of registers while sequentially shifting the data from the inputting to the outputting;
   selecting desired data from among the data stored in the registers based on a predetermined priority;
   extracting the desired data from a corresponding register;
   outputting the desired data to the outputting;
   detecting an error in the desired data;
   writing diagnostic data, which is for diagnosing a failure of the register, in the register from which the desired data is extracted; and
   detecting an error in the diagnostic data, wherein the diagnostic data is sequentially shifted from the register, from which the desired data is extracted, to the output unit so as to enable to diagnose failure in a register during normal operation of the buffer without depending on load conditions.

* * * * *